May 18, 1965 G. CLAUDE 3,184,366
COLLAPSIBLE DISPLAY DEVICE
Filed April 3, 1962 2 Sheets-Sheet 1
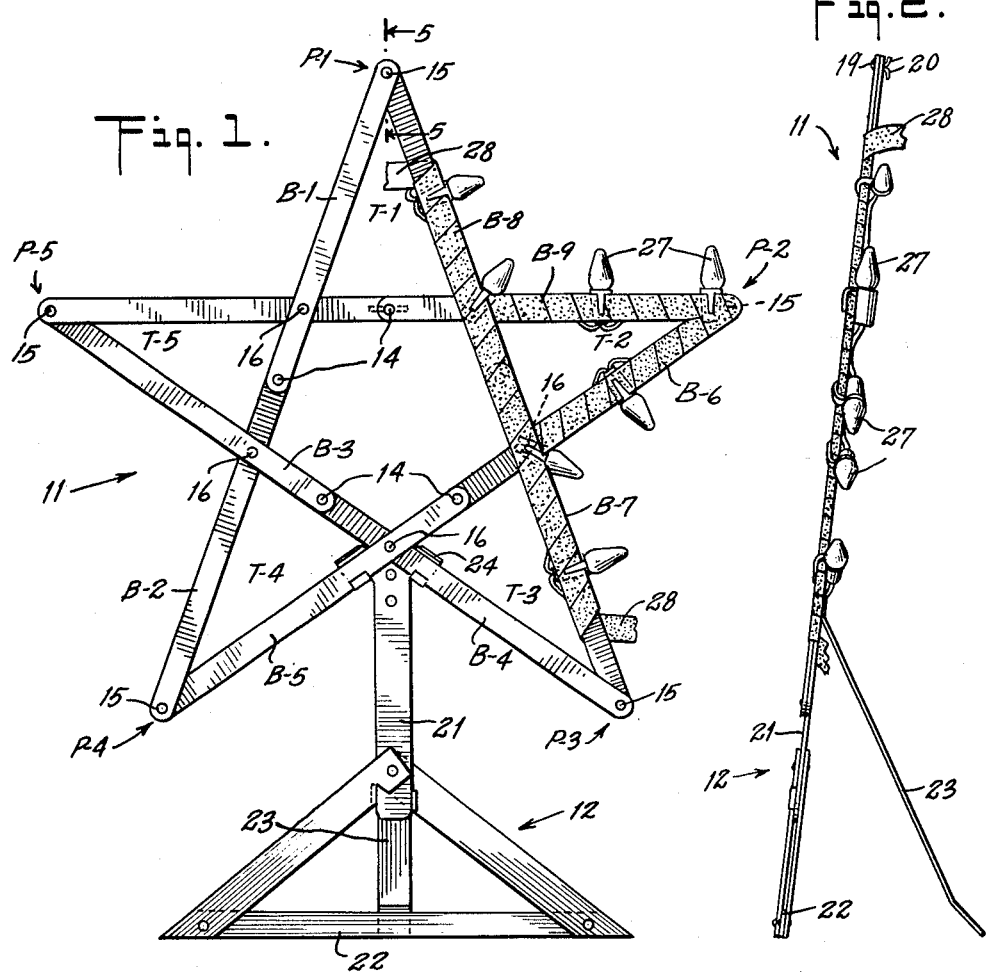
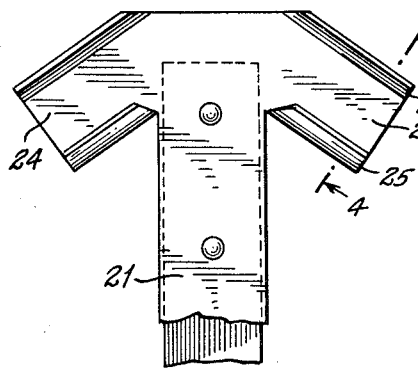
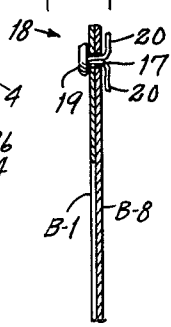
INVENTOR.
GEORGE CLAUDE
BY Krazinski & Nolan
ATTORNEYS May 18, 1965 G. CLAUDE 3,184,366
COLLAPSIBLE DISPLAY DEVICE
Filed April 3, 1962 2 Sheets-Sheet 2
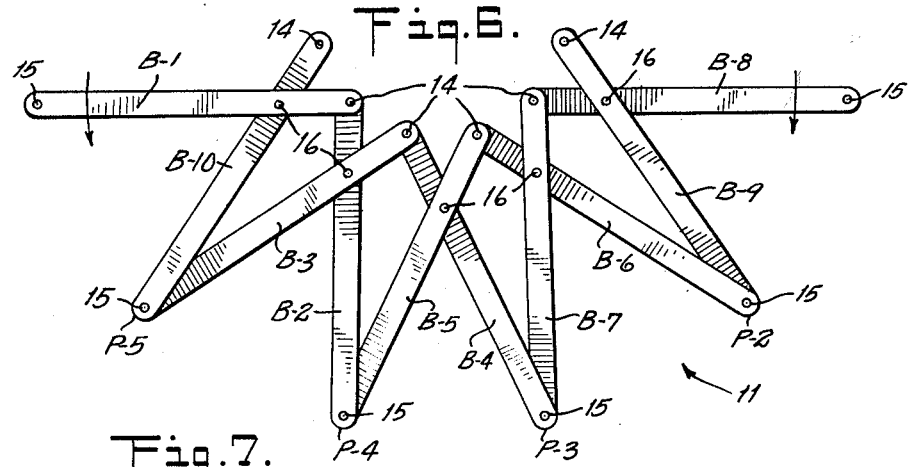
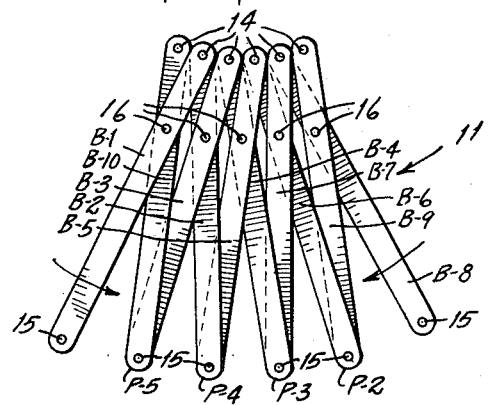
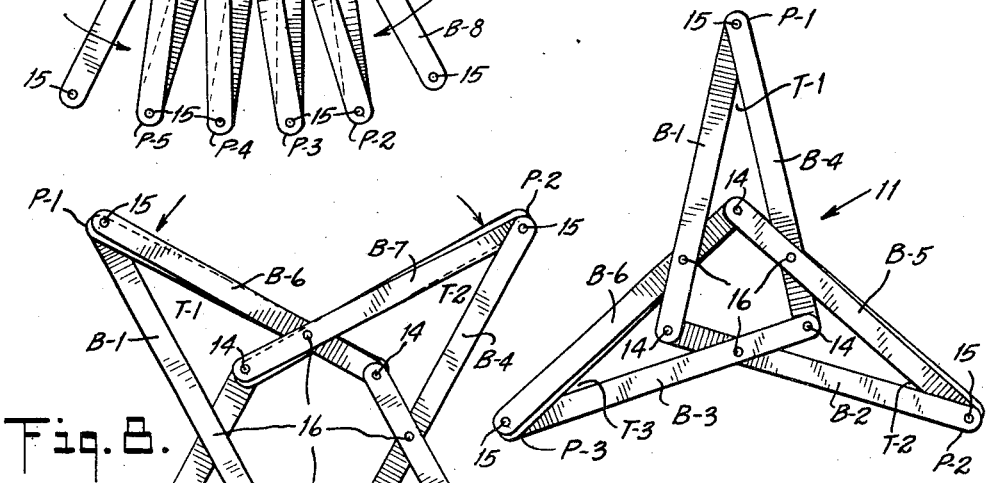
INVENTOR.
GEORGE CLAUDE
BY
Krazinski + Nolan
ATTORNEYS

United States Patent Office 3,184,366
Patented May 18, 1965

3,184,366
COLLAPSIBLE DISPLAY DEVICE
George Claude, 820 Brinsmade Ave., Bronx 65,
New York, N.Y.
Filed Apr. 3, 1962, Ser. No. 184,717
6 Claims. (Cl. 161—14)

The present invention relates to display devices and, more particularly, to an improved display device of the collapsible type.

Numerous display devices are used in homes and places of business for certain periods of the year and are then placed in storage until they are to be used again. Good examples of such display devices are Christmas decorations suitable for indoor or outdoor use which have the shape of a large star.

The difficulty with such display devices is that they are quite bulky and occupy considerable space in storage and may be damaged if not carefully packed. However, such packing is not easy because of the size and odd shape of the display device.

Accordingly, an object of the present invention is to provide a collapsible display device which can be folded together in compact form to facilitate storage thereof.

Another object is to provide such a device which is readily arranged in its display position.

Another object is to provide such a device which can be modified to vary the shape thereof.

A further object is to accomplish the foregoing in a simple, practical and economical manner.

Other and further objects will be obvious upon an understanding of the illustrative embodiment about to be described, or will be indicated in the appended claims, and various advantages not referred to herein will occur to one skilled in the art upon employment of the invention in practice.

In the drawings:

FIG. 1 is a front elevational view of a display device in accordance with the present invention.

FIG. 2 is a side view of the display device shown in FIG. 1.

FIG. 3 is an enlarged fragmentary view of the upper end of a stand for supporting the frame of the display device shown in FIGS. 1 and 2.

FIG. 4 is a sectional view taken along the line 4—4 on FIG. 3.

FIG. 5 is a sectional view taken along the line 5—5 on FIG. 1 illustrating a preferred manner of connecting together parts of the display device.

FIG. 6 is a plan view of the frame of the display device shown in FIG. 1 with certain parts disconnected and the frame partly collapsed.

FIG. 7 is a plan view illustrating the frame fully collapsed.

FIG. 8 is a plan view of a frame for a display device in accordance with the present invention having a modified shape.

FIG. 9 is a plan view of a frame for a display device in accordance with the present invention having a further modified shape.

Referring now to FIGS. 1 to 5 of the drawings in detail, a display device is shown which comprises a frame 11 and a stand 12 for supporting the frame 11 in an upright position. The frame, as shown in FIG. 1, is arranged as a five pointed star having five symmetrically located triangles T-1, T-2, T-3, T-4 and T-5 provided by an arrangement of ten bars B-1 through B-10 in the manner about to be described.

The bars B-1 through B-10 are of equal length and all of these bars have inner and outer ends and all have pivot points 14 (FIG. 6) at their inner ends, pivot points 15 at their outer ends and intermediate pivot points 16 closer to their inner ends than to their outer ends with the respective pivot points of the bars being identically spaced apart.

The bars may be relatively thin, flat rigid metal stampings or may be molded of plastic resin. The pivot points 14, 15 and 16 may be defined by apertures 17 extending through the bars.

For the purpose of general description, the bars may be said to be arranged in pairs with the bars B-1 and B-2, B-3 and B-4, B-5 and B-6, B-7 and B-8, and B-9 and B-10 constituting such pairs; and each pair of bars may be said to have a first bar and a second bar with the bars B-2, B-4, B-6, B-8 and B-10 being the first bars and with the bars B-1, B-3, B-5, B-7 and B-9 being the second bars. By the term "adjacent pair" of bars as used herein, is meant the pairs B-1/B-2 and B-3/B-4, B-3/B-4 and B-5/B-6, B-5/B-6 and B-7/B-8, B-7/B-8 and B-9/B-10, and B-9/B-10 and B-1/B-2; and by the term "once removed pair" of bars as used herein is meant the pairs B-1/B-2 and B-5/B-6, B-3/B-4 and B-7/B-8, B-5/B-6 and B-9/B-10, B-7/B-8 and B-1/B-2, and B-9/B-10 and B-3/B-4.

More specifically, means about to be described are provided for respectively pivotally connecting to each other the inner end pivot points 14 of the bars B-1 and B-2, B-3 and B-4, B-5 and B-6, and B-7 and B-8 but not the inner end pivot points 14 of the bars B-9 and B-10. Similar means are provided for respectively pivotally connecting to each other the intermediate pivot points 16 of the bars B-1 and B-10, B-2 and B-3, B-4 and B-5, B-6 and B-7, and B-8 and B-9. Also similar means are provided for respectively connecting to each other the outer end pivot points 15 of the bars B-3 and B-10, B-2 and B-5, B-4 and B-7, and B-6 and B-9 but not the outer end pivot points 15 of the bars B-1 and B-8.

In the aforementioned arrangement, the combined length of the bars B-1 and B-2 define the distance between the apex of the triangles T-1 and T-4, the bars B-3 and B-4 define the distance between the apex of the triangles T-3 and T-5, the bars B-5 and B-6 define the distance between the apex of the triangles T-2 and T-4, the bars B-7 and B-8 define the distance between the apex of the triangles T-1 and T-3, and the bars B-9 and B-10 define the distance between the apex of the triangles T-2 and T-5.

The inner end pivot points 14 of the bars B-9 and B-10 and the outer end pivot points 15 of the bars B-1 and B-8 are not pivotally connected, but these points are releasably coupled together by means equivalent to the pivotally connecting means to enable the arranged frame shown in FIG. 1 to be collapsed, as shown in FIGS. 6 and 7, with the bars being folded together by pivotal movement about the beforementioned pivot points.

Also, each second bar B-1, B-3, B-5, B-7 and B-9 is superimposed on a first bar B-10, B-2, B-4, B-6 and B-8, respectively, of an adjacent pair, whereby the bars are adapted to be collapsed as shown in FIG. 7.

The means for pivotally and releasably connecting the bars, as just described, may be elements generally known as round head paper fasteners 18 (FIG. 5) which comprise a head 19 and a pair of members 20 extending through the pivot point apertures 17 and being bent outwardly in opposite directions. These elements enable pairs of bars to be taken off or added to the frame to vary the shape thereof in the manner about to be described.

The frame shown in FIG. 8 has four symmetrically located triangles T-1, T-2, T-3 and T-4 which are provided by an arrangement of eight bars B-1 through B-8. This can be accomplished by removing bars B-9 and B-10 from the frame shown in FIGS. 1, 6 and 7 after disconnecting the pivot points 14, 15 and 16 of these two bars.

In such an eight bar arrangement the inner end pivot points 14 of the bars B–1 and B–2, B–3 and B–4, and B–5 and B–6 remain respectively pivotally connected to each other, but the inner end pivot points 14 of the bars B–7 and B–8 are disconnected until coupled together to fix the frame in the form shown in FIG. 8. Similarly, the intermediate pivot points 16 of the bars B–1 and B–8, B–2 and B–3, B–4 and B–5, and B–6 and B–7 are respectively pivotally connected to each other. Also, the outer end pivot points 15 of the bars B–3 and B–8, B–2 and B–5, and B–4 and B–7 are respectively pivotally connected to each other, but the outer end pivot points of the bars B–1 and B–6 remain disconnected until coupled together to fix the frame in the form shown in FIG. 8.

The frame shown in FIG. 9 has three symmetrically located triangles T–1, T–2 and T–3 which are provided by an arrangement of six bars B–1 through B–6. This can be accomplished by removing bars B–7 and B–8 from the frame shown in FIG. 8 after disconnecting the pivot points 14, 15 and 16 of these two bars.

In such a six bar arrangement, the inner end pivot points 14 of the bars B–1 and B–2, and B–3 and B–4 remain respectively pivotally connected to each other, but the inner end pivot points of the bars B–5 and B–6 are disconnected until coupled together to fix the frame in the form shown in FIG. 9. Similarly, the intermediate pivot points 16 of the bars B–1 and B–6, B–2 and B–3, and B–4 and B–5 are respectively pivotally connected to each other. Also, the outer end pivot points 15 of the bars B–3 and B–6, and B–2 and B–5 are respectively pivotally connected to each other but the outer end pivot points of the bars B–1 and B–4 remain disconnected until coupled together to fix the frame in the form shown in FIG. 9.

It will be understood that a six pointed star can be provided by adding two bars to the arrangement shown in FIG. 1. In the same manner two bars can be added to the arrangement shown in FIG. 8 to produce the arrangement shown in FIG. 1.

As shown in FIGS. 1 and 2, the frame may be utilized for supporting any suitable decoration or ornamentation, for example, a group of electric lights 27. Also, the bars or other frame members may be covered with decorative or ornamental material, for example, tinfoil, tinsel 28 or the like.

The stand 12 shown in FIGS. 1, 3 and 4 comprises an upright member 21, a base member 22 of considerable width secured to the upright member 21 and a foldable member 23 connected to the upright member to provide a tripod arrangement for supporting the upright member, and a means, such as clips 24, at the upper end of the upright member 21 for engaging the bars B–4 and B–5 adjacent their intermediate pivot point connection (FIG. 1).

The clips 24 have a U-shaped channel 25 at the bottom thereof for receiving the lower edge of the bars and have a tab 26 at the top thereof (FIGS. 3 and 4) adapted to be folded over the upper edge of the bars to retain the bars within the clips. To accomplish this, the channels and tabs are slanted in the same manner as the respective edges of the bars engaged thereby.

From the foregoing description, it will be seen that the present invention provides a frame arrangement for display devices which is simple, practical and economical and can be modified by adding or taking off bars to produce a variety of forms.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. A collapsible frame for a display device adapted to be supported in an upright position comprising a plurality of bars of equal length arranged to provide a plurality of at least three symmetrically located triangles, each of said bars having a similarly placed aperture adjacent each end and another similarly placed aperture intermediate one end and a mid point of said bars, means for pivotally interconnecting a plurality of pairs of said bars at said intermediate apertures, whereby said pairs of bars have freely extending long ends and freely extending short ends in spaced substantially cross-shaped formations, means for serially interconnecting the long ends and short ends of said plurality of pairs of bars at said end apertures to form an interconnected frame having at each side thereof one of said bars with a freely extending long end and one of said bars with a freely extending short end, and means for connecting said side bar short ends together and said side bar long ends together at their end apertures, whereby said triangles are provided.

2. A collapsible frame in accordance with claim 1, wherein six of said bars are interconnected to provide three symmetrically located triangles.

3. A collapsible frame in accordance with claim 1, wherein eight of said bars are interconnected to provide four symmetrically located triangles.

4. A collapsible frame in accordance with claim 1, wherein ten of said bars are interconnected to provide five symmetrically located triangles.

5. A collapsible frame in accordance with claim 1, including a stand for supporting the frame in an upright position.

6. A collapsible frame in accordance with claim 1, including a plurality of multi-colored lamps carried by the bars of said frame.

References Cited by the Examiner

UNITED STATES PATENTS

| 207,346 | 8/78 | Clow | 41—118 |
|---|---|---|---|
| 590,071 | 9/97 | Oldenbusch | 248—37 X |
| 1,541,004 | 6/25 | Taylor | 46—29 X |
| 2,116,301 | 5/38 | Champlin | 46—29 XR |
| 2,549,006 | 4/51 | Propst | 41—11 X |

FOREIGN PATENTS

| 285,249 | 12/13 | Germany. |
| 569,377 | 5/45 | Great Britain. |

ALEXANDER WYMAN, *Primary Examiner.*
EARL M. BERGERT, JACOB STEINBERG,
*Examiners.*